(12) United States Patent
Berry et al.

(10) Patent No.: US 10,523,558 B2
(45) Date of Patent: Dec. 31, 2019

(54) VIDEO NETWORK

(71) Applicant: Sony Corporation, Tokyo (JP)

(72) Inventors: David Berry, Farnham (GB);
Jian-Rong Chen, Shinfield (GB);
Stephen Olday, Basingstoke (GB)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 15/515,774

(22) PCT Filed: Sep. 1, 2015

(86) PCT No.: PCT/GB2015/052522
§ 371 (c)(1),
(2) Date: Mar. 30, 2017

(87) PCT Pub. No.: WO2016/059365
PCT Pub. Date: Apr. 21, 2016

(65) Prior Publication Data
US 2017/0310576 A1    Oct. 26, 2017

(30) Foreign Application Priority Data

Oct. 17, 2014   (GB) .................................. 1418507.8

(51) Int. Cl.
*H04L 12/707* (2013.01)
*H04J 3/06* (2006.01)
(Continued)

(52) U.S. Cl.
CPC ............ *H04L 45/22* (2013.01); *H04J 3/0632* (2013.01); *H04L 29/06027* (2013.01); *H04N 21/4302* (2013.01); *H04N 21/4382* (2013.01)

(58) Field of Classification Search
None
See application file for complete search history.

(56) References Cited

U.S. PATENT DOCUMENTS 5,864,554 A    1/1999  Rostoker et al.
6,259,695 B1   7/2001  Ofek
(Continued)

FOREIGN PATENT DOCUMENTS

GB         806636     12/1958
GB       2516316 A    1/2015

OTHER PUBLICATIONS

International Search Report dated Nov. 11, 2015 in PCT/GB2015/052522 filed Sep. 1, 2015.

*Primary Examiner* — Otis L Thompson, Jr.
(74) *Attorney, Agent, or Firm* — Oblon, McClelland, Maier & Neustadt, L.L.P.

(57) ABSTRACT

A packet-based video network includes: plural packetized video data nodes; a packet switch configured to switch from one of video packet routes to another of video packet routes; and a video synchronizer configured to synchronize the video frame periods of at least nodes acting as packetized video data sources; wherein: each node acting as a packetized video data source is configured to launch onto the network packetized video data such that, for at least video frame periods adjacent to a switching operation: the node launches onto the network packetized video data required for decoding that frame during a predetermined active video data portion of the video frame period, and the node does not launch onto the network packetized video data required for decoding that frame during a predetermined remaining portion of the video frame period; and the switching operation is implemented during the predetermined remaining portion.

12 Claims, 6 Drawing Sheets

(51) Int. Cl.
 *H04L 29/06* (2006.01)
 *H04N 21/43* (2011.01)
 *H04N 21/438* (2011.01)

(56) References Cited

U.S. PATENT DOCUMENTS

| | | |
|---|---|---|
| 6,260,193 B1 | 7/2001 | Chang et al. |
| 6,272,131 B1 | 8/2001 | Ofek |
| 6,754,210 B1 | 6/2004 | Ofek |
| 2005/0018079 A1* | 1/2005 | Van Der Vleuten .......................... H04N 7/0882 348/468 |
| 2005/0138674 A1 | 6/2005 | Howard et al. |
| 2005/0251849 A1* | 11/2005 | Telyuk ................. H04N 7/0882 725/137 |
| 2006/0214950 A1* | 9/2006 | Hsieh .................... G06F 3/1446 345/634 |
| 2007/0133560 A1 | 6/2007 | Nam et al. |
| 2012/0013807 A1 | 1/2012 | Arora et al. |
| 2014/0160357 A1 | 6/2014 | Arora et al. |
| 2015/0271418 A1 | 9/2015 | Arora et al. |
| 2016/0352618 A1* | 12/2016 | Edwards ................. H04L 45/22 |
| 2018/0109441 A1* | 4/2018 | Meyer ................... H04J 3/0667 |
| 2018/0131607 A1* | 5/2018 | Reid .................. G06F 13/4022 |

* cited by examiner

| VERSION 1 | SOURCE 60 | SOURCE 70 |
|---|---|---|
| DEST 80 | X | |

| IP | UDP | RULE |
|---|---|---|
| (SOURCE 60 IP) | 100 | FORWARD PORT 80 |

| VERSION 2 | SOURCE 60 | SOURCE 70 |
|---|---|---|
| DEST 80 | | X |

| IP | UDP | RULE |
|---|---|---|
| (SOURCE 60 IP) | 100 | FORWARD PORT 80 |
| (SOURCE 70 IP) | 200 | FORWARD PORT 80 |

VIDEO NETWORK

CROSS REFERENCE TO RELATED APPLICATIONS

The present application claims the benefit of the earlier filing date of GB1418507.8 filed in the United Kingdom Intellectual Property Office on 17 Oct. 2014, the entire content of which application is incorporated herein by reference.

BACKGROUND

Field

This disclosure relates to video networks.

Description of Related Art

The background description provided here is for the purpose of generally presenting the context of the disclosure. Work of the presently named inventors, to the extent that it is described in the background section, as well as aspects of the description which may not otherwise qualify as prior art at the time of filing, are neither expressly nor implicitly admitted as prior art against the present disclosure.

Carrying video data over a packetized data network, such as an Ethernet network, involves dividing the video data into data packets, conveying the packets from a source device to a destination device, and reassembling the packets into a version of the original video data.

In a studio environment, or another part of a video production environment, there are constraints which go beyond the simple requirement to rebuild the original data stream at the destination device. These additional constraints relate to (i) the volume of data, (ii) the need to retain time synchronisation at the destination devices between received data from multiple sources, regardless of delays suffered during packet routing, and (iii) the need to send data from multiple sources to multiple destinations.

In terms of the volume of data, a video production environment typically requires frame-specific editing, which means that each individual frame must be capable of being reconstructed from the video data independently of any other video frame. This means that so-called long GOP video data compression techniques, in which some frames are derived from the decoded data for other frames, are not used (which in turn implies that for a particular image resolution and quality, the quantity of data being routed will be higher than if long GOPs were used). Also, in this type of environment, image quality is often considered a priority, which again means that the data may be uncompressed, with each being represented by a relatively high quantity of data compared to other compressed video streams.

Time synchronisation is particularly important in a studio or video production environment, to allow a final video programme to be assembled from multiple video sources. Not only is it important (at least at the point of receipt or subsequent processing of the streams) that multiple streams are synchronised with one another, it is also important to be able to provide so-called "clean switching" between streams, so that when switching from one packetized video stream to another, a last frame of the first stream is received in its entirety and a first frame of the new stream is also received in its entirety, without any gap or overlap between the two streams.

Even if the original and new streams were exactly time-aligned with one another, currently available packet switching technology does not provide sufficient temporal accuracy in terms of switching time to allow a purely switch-timed operation, which is to say a switching from one stream to another in exact synchronism with video frame boundaries.

FIG. 1 of the accompanying drawings is a schematic block diagram of a previously proposed video studio network illustrating destination timed packet switching. For clarity of the diagram, FIG. 1 illustrates just two video sources 10, 20 and part of the operation of a video destination including a buffer arrangement 32 and a display device 34. It will be appreciated that throughout the present description, the representation of video sources as camera devices and the representation of a video destination as including a display device merely represent illustrative examples of the many different types of video sources and video destination that may be applicable to a video network environment such as a video studio environment. Many other types of video source (such as a video storage device, a video transmission link receiver, a video effects machine and so on), and many other types of video destination (such as a video storage device, a video transmission link transmitter, a video effects machine and so on) may be used. It will be appreciated that a particular device may at the same time, or at different times, act as a video source in the context of one packetized video signal, but as a video destination in the context of another packetized video signal. It will also be appreciated that throughout the present description, the representation of just two video sources and one video destination is in order to provide a simplified example of switching from one signal to another; in a real video network environment there could be many more video sources and/or many more video destinations. It will be appreciated that throughout this description, a significant feature is the need to switch from one packet route to another packet route. This could relate to switching packets from a single source to a selected one of two or more destinations. Therefore, the source(s) and destination(s) described here are just examples of network nodes, where the nodes can be sources and/or destinations, and the use of a switch to provide two or more packet routes amongst the nodes.

It will also be appreciated that while the discussion here concerns (for clarity of explanation) video packets, a video packet stream may also include audio and/or ancillary data.

The arrangement of FIG. 1 uses so-called IP multicast routing, such that each video source 10, 20 launches onto the network video packets having an associated multicast address. Each video source will be assigned a unique multicast address or a source and multicast address pair (S, G) in the case of SSM (Source Specific Multicast) to identify its multicast group.

A video receiver or destination device such as the device 30 is able to select a source by joining the corresponding multicast group. The joining and leaving of a multicast group can be controlled by using IGMP (Internet Group Management Protocol) messages 40 sent by the destination device 30, to a packet router 50. Video switching is realized when a destination device leaves its current source group and joins a new source group. A so-called double buffering procedure is used to achieve clean switching, which is to say, switching from one source to another source having arbitrary frame timing, without a gap or a partial frame in the output (switched) video stream.

Assume for the sake of this explanation that the destination device is initially receiving video data from the source 10, by virtue of having joined the multicast group corresponding to the source 10. To achieve the switching process to receive video data from the source 20 instead, the destination device 30 first sends an IGMP JOIN message to join the group of the new source 20. It then starts to buffer data from the new source in a buffer 36, while continuing to buffer (in a buffer 38) and output data from the original source 10. When it reaches a frame boundary in the data from the current video source 10, it checks if there is a frame boundary in the frame buffer 36 of the new video source 20. If there is one, a switch 42 will operate so that the destination device 30 starts to output data from the frame buffer 36 of the new source. The destination device sends an IGMP LEAVE message to the router 50 so as to leave the group of the old source.

The technique of FIG. 1 requires that the destination device has to receive two video streams simultaneously and carry out double buffering during the switch operation. This has an impact on network cost as double bandwidth is required for destination devices that require clean switching, although this shortcoming can be partially alleviated by using a so-called frame hold method, which is to leave the current stream immediately after a frame boundary but retain the last buffered frame of the current stream, and to join the new stream at that point. The retained frame can be re-used while waiting for a complete frame from the new stream. Although the visual impact to a viewer of a repeated frame is considered to be relatively low, it would be desirable not to need to repeat video frames.

The emerging of so-called SDN (Software Defined Networking) in data networking has provided opportunities to create more flexible packet switched networks, which can be customized to meet specific application needs. To address the perceived bandwidth waste in destination timed clean switching, techniques have been proposed which use an SDN switch with a source based trigger to implement clean switching.

Traditional packet switches typically have a packet forwarding table based on either Ethernet or IP addresses. By contrast, SDN switches allow an application to setup packet forwarding table based on a much wider selection of fields in an IP packet in addition to Ethernet and IP addresses. For example, packet forwarding decisions can also be based on UDP (user datagram protocol) source port and destination addresses. The arrangement of FIG. 2 of the accompanying drawings schematically illustrates a previously proposed technique by which clean switching can be initiated by controlling source devices in combination with a SDN switch. Source-timed switching involves a source (or more than one source) changing its packet header value so as to trigger a new data flow on a packet switch.

Once again, FIG. 2 schematically illustrates two video sources 60, 70 and a video destination 80. The video sources 60, 70 and the video destination 80 operate under the control of a common video timing controller 90 which, in the context of a packet-based video studio network, might be a so-called SMPTE 2059-2 (IEEE 1588) packet-based timing signal.

A system controller 100 sets up forwarding table entries in a routing table 112 of an SDN switch 110 which controls the routing, by a forwarding engine 114, of video packets according to their UDP source port. The system controller 100 establishes which UDP port is to be forwarded to the destination device 80 by the forwarding engine 114, such that packets identified as that UDP port received by the SDN switch 110 are sent to the destination. Also, the system controller 100 controls the port established by each source 60, 70 in respect of its output packets. To achieve a switching operation, the system controller requests the video sources to change UDP ports at a frame boundary. In the case of SMPTE 2022-6 encapsulated video, the system controller 100 could choose the packet that contains the RP168 defined switching point. The packets with new UDP port will trigger the new forwarding behaviour established by the routing table.

This method does not require destination devices to be involved in control signalling to carry out clean switching. However it may still need double buffering (of the type discussed with reference to FIG. 1 above) or a repetition of a last frame of the original source signal to avoid possible buffer underflow. This is because the two video streams may have slight timing difference, and also the change of UDP source port command on two sources may not be carried out in perfect synchronisation.

Both source-timed and destination-timed clean switching described above require either double buffering of two streams or potentially repeating the last frame to make up for timing variation between different streams.

Accordingly, there exists a need for an improved technique of switching packet-based video.

SUMMARY

This disclosure provides a packet-based video network comprising:

a plurality of packetized video data nodes acting as packetized video data sources and/or packetized video data destinations;

a packet switch configured to provide at least two selectable video packet routes amongst the plurality of nodes and to switch from one of the video packet routes to another of the video packet routes at a switching operation; and a video synchroniser configured to synchronise the video frame periods of at least those nodes acting as packetized video data sources; in which:

each node acting as a packetized video data source is configured to launch onto the network packetized video data such that, for at least those video frame periods adjacent to a switching operation:

the node launches onto the network packetized video data required for decoding that frame during a predetermined active video data portion of the video frame period, and the node does not launch onto the network packetized video data required for decoding that frame during a predetermined remaining portion of the video frame period;

and the network is configured so that a switching operation from one of the video packet routes to another of the video packet routes is implemented during a time period corresponding to the predetermined remaining portion.

The present disclosure both recognises and addresses the problem of providing so-called clean switching of video data in the type of packet switched video network described above.

Here, clean switching refers to a situation in which a destination device is switching its video input from one source device to another source device, and in particular to the need for the destination device to have a complete video frame for each video frame period.

Further respective aspects and features of the present disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
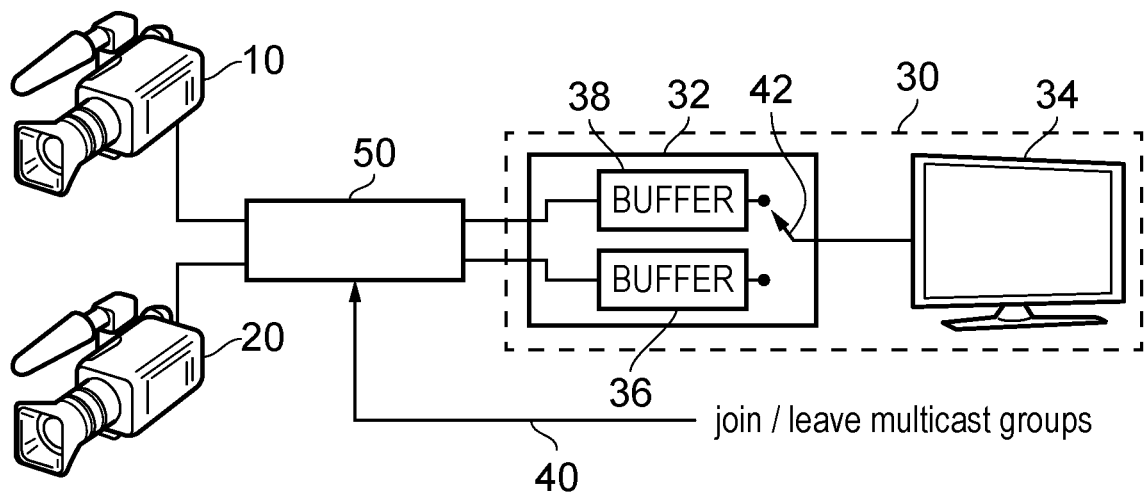
FIG. 1 is a schematic block diagram of a previously proposed video studio network illustrating destination timed packet switching.

As discussed above, both of the previously-proposed systems, source-timed and destination-timed clean switching, require either double buffering of two streams or repeating the last frame to make up for timing variation between different streams. Fundamentally this is because video (and audio when it is associated with video) is defined by a frame unit, while Ethernet or IP networks are based on data packets which are much smaller than a frame. If however (as provided by embodiments of the present disclosure) a macro structure can be created on top of the fine packet structure that corresponds to a frame, then the problem of frame alignment becomes more straightforward.

For comparison, in a synchronous video distribution system such as a so-called SDI based system, video data generally counts for less than 90 percent of the signal bandwidth. For example, when 1080/50P 4:2:2 10 bit video (with a frame time of 40 ms) is mapped to third generation SDI, the video data rate is 2.08 Gbit/s and the SDI signal rate is 2.97 Gbit/s. Video therefore occupies only 70% of bandwidth or time window. For 1080/60P 4:2:2 10 bit video (with a frame time of 16.7 ms), the figures are 2.49 Gbit/s and 2.97 Gbit/s respectively corresponding to 84% of the available bandwidth. Assuming a frame rate of 120 fps (frames per second), each frame has a time window of about 8.3 ms.

Embodiments of the present disclosure involve redistributing video packets in time, so as to create a so-called Virtual Blanking Interval (VBI), which is an artificially created time period within each frame of a packetized video signal during which no video packets are conveyed (though it is possible that other data such as ancillary data could be carried by packets during the Virtual Blanking Interval). In the example just given, for example 3% of the time period of each frame can be associated with the Virtual Blanking Interval, that is about 250 µs. Embodiments of this arrangement therefore involve the video (and audio) sources shaping packet streams into packet trains that have a virtual blanking gap between them. Here, the term "shape" implies a redistribution over time, and will be discussed in more detail below.

At least some embodiments may make use of device synchronisation using, for example the SMPTE 2059-2 PTP profile. A common epoch and frame time code mapping is defined in SMPTE 2059-1. So a synchronized start of frame time can be derived by any device using the above two standards to microsecond accuracy level.

If switching action is carried out during the Virtual Blanking Interval and the sources are time synchronised, then clean switching can be guaranteed at frame level, and there is no need for double buffering or repeat of the last frame.

The technique of shaping a packet stream over time so as to reserve a Virtual Blanking Interval can be used with source-timed clean switching of the type discussed with reference to FIG. 2 above. In that case, the command to change the source UDP port should carry a time field to specify at which frame in the VBI the UDP port should be changed. It would eliminate the need of double buffering or frame repeat at the destination device. This arrangement will be discussed below with reference to FIGS. 14 to 18.

Alternatively, a switching action can be carried out by the packet switch itself during the Virtual Blanking Interval.

Examples of these techniques will now be described. Example usage of the techniques in connection with routing by the packet switch will be described, along with a description of data formats including a Virtual Blanking Interval. Then, example usage of the data format in connection with source-timed switching will be described.

Figure 3:
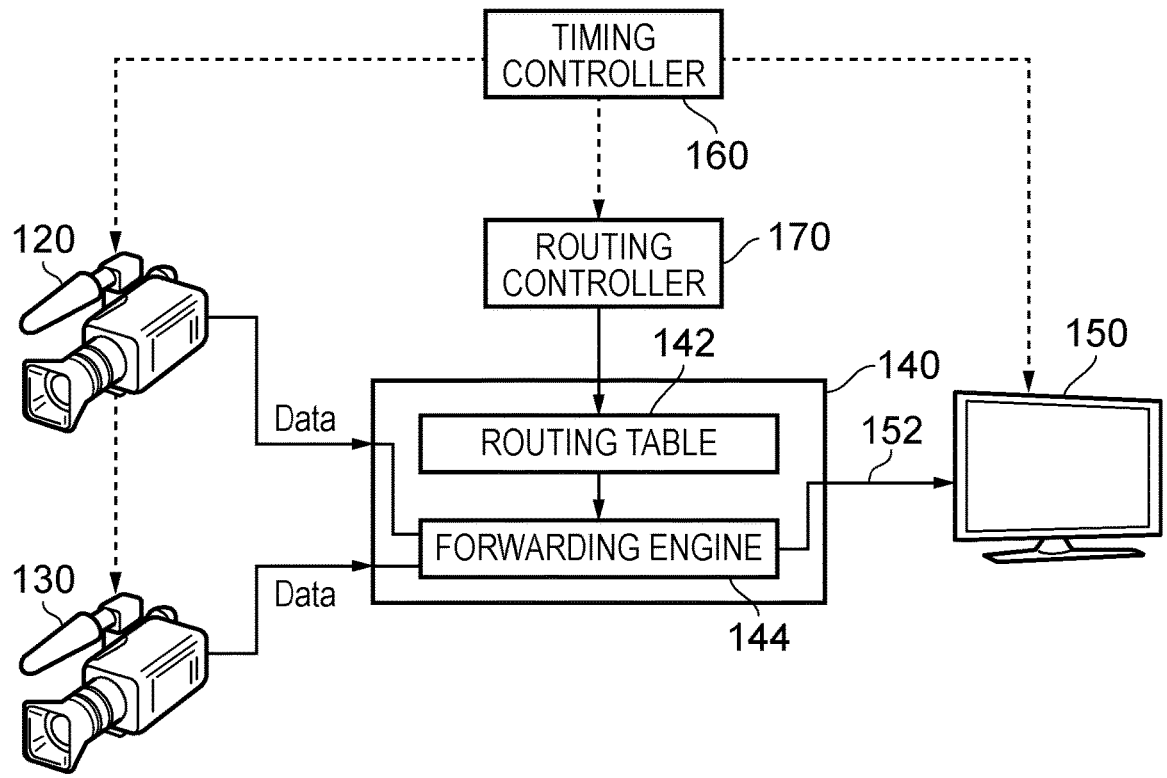
FIG. 3 is a schematic block diagram of a video studio network illustrating packet switching according to an embodiment of the present disclosure.

FIG. 3 is a schematic block diagram of a video studio network illustrating packet switching according to an embodiment of the present disclosure.

In FIG. 3, two example video sources 120, 130 are provided. Video data from a currently-selected one of these sources is routed by an SDN switch 140 to a destination device 150. All of the source and destination devices (which are examples of a plurality of packetized video data nodes acting as packetized video data sources and/or packetized video data destinations) are under the control of a timing controller 160 so as to synchronise their operations to a common frame timing. An example of a technique by which this is achieved is the use of the SMPTE 2059-2 PTP profile and associated methods.

Note that it is not a requirement that the destination device is synchronised by the timing controller, although this can be helpful in the operation of this type of network. Accordingly the timing controller provides an example of a video synchroniser (or video synchroniser circuitry) configured to synchronise the video frame periods of at least those nodes acting as packetized video data sources.

The SDN switch 140 is a packet switch (or packet switch circuitry) configured to provide at least two selectable video packet routes amongst the plurality of nodes and to switch from one of the video packet routes to another of the video packet routes at a switching operation. A routing controller 170 supplies routing data to a routing table 142 forming part of the SDN switch 140, forming an example of a routing data memory configured to store routing data, such that the packet switch routes video data packets between nodes according to one or more video packet routes defined by the routing data stored by the routing data memory. Data held by the routing table 142 in turn defines packet routing by a forwarding engine 144 of the SDN switch 140, so that changes made to the routing table 142 result in packet routing changes by the forwarding engine 144. However, the nature of the communication between the routing controller 170 and the routing table 142, and/or the communication and control between the routing table 142 and the forwarding engine 144, mean that routing changes cannot be implemented at a timing corresponding to an individual packet in a stream. Furthermore, in a video packet stream, even a stream synchronised to frame timing by a timing controller of the type discussed above, it may not necessarily be possible to predict from the packet-level timing alone (without deep inspection of the packet contents) which individual packet is the last of a particular frame and which is the first packet of a next frame.

Accordingly, while routing changes can be made by the routing controller 170 using the techniques just described, this arrangement alone cannot necessarily provide a clean switching operation such that the video stream 152 routed to the destination device 150 stops at the end of a whole frame of one source stream and restarts straight away with the whole of a frame from another source stream.

Figure 4:
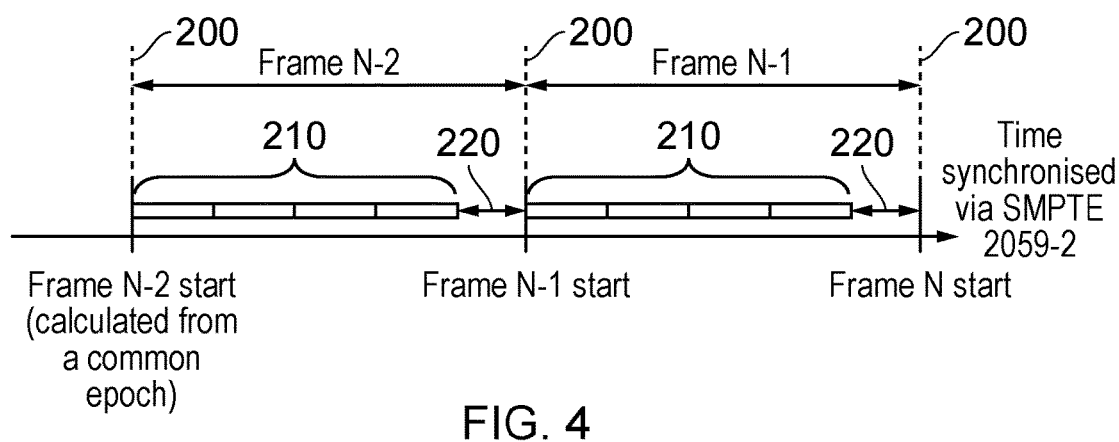
FIG. 4 is a schematic timing diagram illustrating a switching interval.

To address this, as mentioned above, a so-called Virtual Blanking Interval is provided within the video data streams. FIG. 4 is a schematic timing diagram illustrating such a Virtual Blanking (switching) interval.

In FIG. 4, frame intervals are indicated by vertical lines 200, such that the three vertical lines shown in FIG. 4 schematically represent the start of three successive frames, namely frame N-2, frame N-1 and frame N at an arbitrary position within a video stream.

Within each frame, video data corresponding to that frame is represented by a train or set of packets 210, such that all of the video data required to reproduce an individual frame may be derived from the corresponding train of packets 210.

A Virtual Blanking Interval 220 forms part of each frame period, or at least those frame periods adjacent to a switching operation (in which case, the sources involved in the switching operation could be instructed, for example by the routing controller 170, to provide a Virtual Blanking Interval for a short period, for example a period starting at least a frame ahead of the anticipated switching time). In the example shown in FIG. 4, the Virtual Blanking Interval is shown at the end of the frame period. Other examples will be discussed below. The Virtual Blanking Interval 220 does not directly correspond to any part of the generation or display timing for the video signal, but is provided in order to allow a time window disposed between the set of packets corresponding to one frame and the set of packets corresponding to a temporally adjacent frame, during which a switching operation to switch between one packet stream and another packet stream may take place. Note that, as discussed above, all of the devices in FIG. 3 are synchronised by the timing controller 160, so that for each video stream from each source device (such as the devices 120, 130) the Virtual Blanking Interval for the respective stream will occur at substantially the same time as the Virtual Blanking Interval for each other source stream.

The Virtual Blanking Interval 220 does not contain any video packets required for the reproduction of the corresponding frame of video. It can, of course, contain other data packets, which may be selected from (for example) ancillary data packets, dummy data packets and the like. Therefore, a switching operation from one stream to another stream, which is made between time-synchronised sources during the Virtual Blanking Interval 220 such that (a) the switching operation does not start until the Virtual Blanking Interval 220 has started, and (b) the switching operation finishes before the end of the Virtual Blanking Interval, will be a so-called clean switch so that the switched (output) video stream contains the whole of a final frame of the original source stream followed immediately by the whole of a first frame of the new (switched-to) source stream.

The network is configured so that a switching operation from one of the video packet routes to another of the video packet routes is implemented during a time period corresponding to the predetermined remaining portion. For example, the network can be configured so that at a switching operation, new routing data is written to the routing data memory at a time so that a change in routing takes effect during a time period corresponding to the predetermined remaining portion. Note that the time period could be the Virtual Blanking Interval of one frame or, if Virtual Blanking Intervals of two frames are temporally adjacent (for example, one part at the end of a first frame, one part at the start of the next frame) the time period could encompass both of those temporally adjacent Virtual Blanking Intervals.

Techniques for generating data streams containing Virtual Blanking Intervals will now be described.

Figure 5:
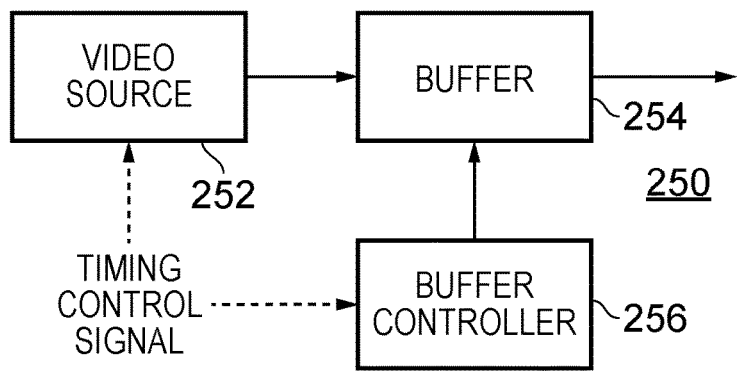
FIG. 5 schematically illustrates a video source.

FIG. 5 schematically illustrates a video source device 250 comprising a source 252 of video data, a data buffer 254 and a buffer controller 256. The source 252 and the buffer controller 256 are under the control of a timing control signal derived from the timing controller 160 of FIG. 3.

Figure 6:
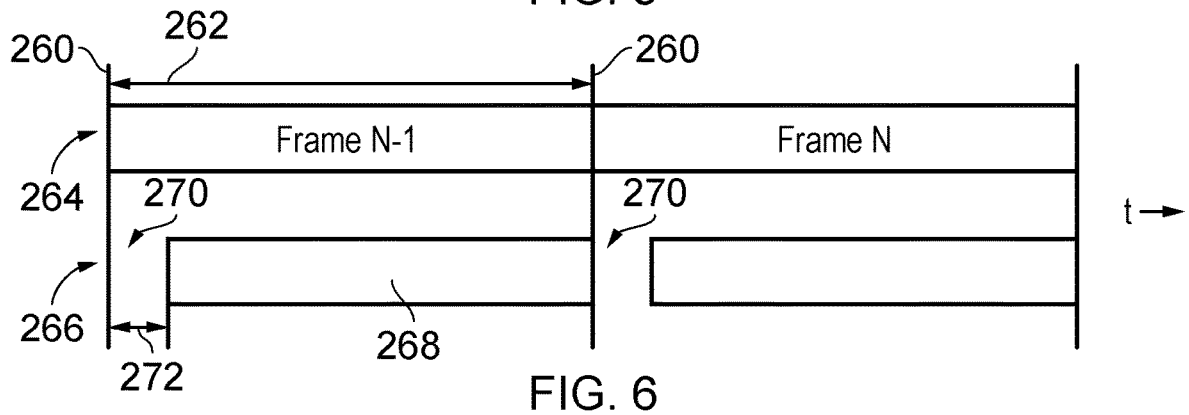
FIG. 6 is a schematic timing diagram illustrating operation of the video source of FIG. 5.

FIG. 6 is a schematic timing diagram illustrating operation of the video source of FIG. 5. In FIG. 6, successive frame periods are indicated by vertical lines 260 marking the boundary between each frame period. Therefore, a whole frame period is represented by the extent 262 as drawn. The source 252 produces video data 264, frame by frame, according to the timing indicated by the frame boundaries represented by the lines 260. A pair of example video frames, namely a frame N-1 and a next-following frame N are schematically illustrated in FIG. 6. As output by the source 252, the video data 264 corresponding to each frame occupies substantially all of the respective frame period 262.

The buffer 254 of FIG. 5, under the control of the buffer controller 256, is used to shape, which is to say, alter the time distribution of, the packetized video data 264 output by the video source 252 to generate shaped video data 266 having (in this example) a Virtual Blanking Interval 270 at the start of each frame of shaped video data, and also to distribute the video packets evenly or at least substantially evenly during the period 268.

To achieve this, the buffer controller 256 controls the writing into and reading from the buffer 254 so as to impose a delay corresponding to the length of the required Virtual Blanking Interval 270 at the start of the output of data corresponding to each video frame. Then, as data continues to be written into the buffer, the remaining portion 268 of the frame period is used to output the whole frame of video data slightly faster than the rate at which it is being written into the buffer 254 by the source 252. So, by the time of the next frame boundary (represented by the next instance of a line 260) the buffer occupancy has returned to the same buffer occupancy as that applicable at the previous frame boundary.

Accordingly, apart from any constant level of buffer occupancy which may be desirable for other technical reasons, the maximum amount of buffering required over the course of the input and output of a frame of video data resulting from the insertion of the Virtual Blanking Interval corresponds to data normally transmitted during the length 272 of the Virtual Blanking Interval 270. For example, if the Virtual Blanking Interval represents (say) 3% of the frame length, then the maximum amount of data which the buffer 254 needs to store is 3% of a whole frame of video data. Buffer occupancy is at a maximum at a point in time corresponding to the end of the Virtual Blanking Interval in this example, and decreases (for example, linearly) during the remaining portion 268 of the frame period, to a minimum occupancy at the start of the next Virtual Blanking Interval.

It will be appreciated that the buffer 254 and the buffer controller 256 can be provided as part of a source device 250, or could be provided as a separate device for applying packet stream shaping to the output of a stand-alone video source. Similar considerations apply to the configuration shown in FIG. 7.

Figure 7:
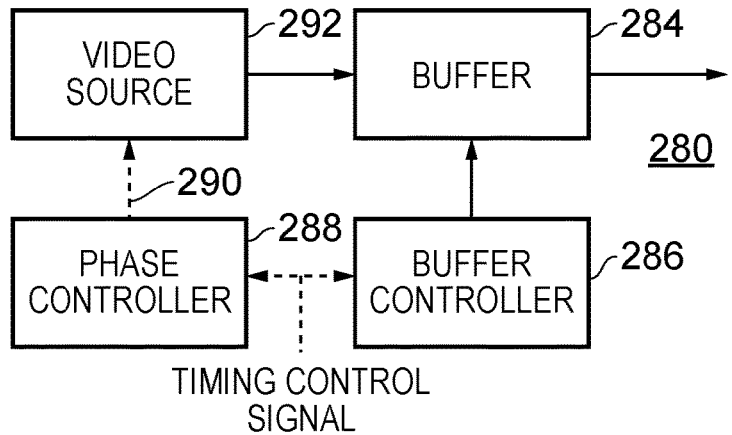
FIG. 7 schematically illustrates another example of a video source.

FIG. 7 schematically illustrates another example of a video source 280. Several aspects such as a buffer 284 and a buffer controller 286) are similar to those described with reference to FIG. 5 and will not be described again in detail here. In FIG. 7, the buffer controller 286 and a phase controller 288 operate under the control of a timing control signal received from the timing controller 160 of FIG. 3. The phase controller 288 generates a timing signal 292 control operation of a video source 292 such that the video source 292 operates slightly in advance of the frame boundaries defined by the timing control signal received from the timing controller 160. The reasons for this will be described with reference to FIG. 8.

Figure 8:
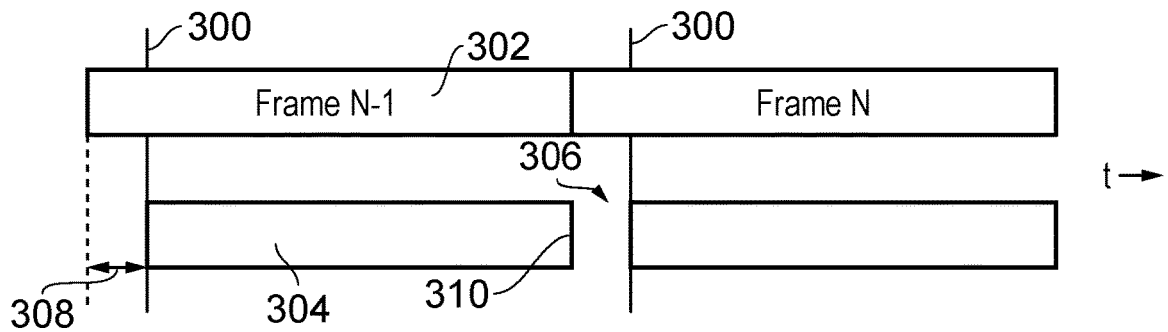
FIG. 8 is a schematic timing diagram illustrating operation of the video source of FIG. 7.

FIG. 8 is a schematic timing diagram illustrating operation of the video source of FIG. 7. Vertical lines 300 indicate frame boundaries in the timing control signal received from the timing controller 160. That is to say, the frame boundaries indicated by the lines 300 are those under which the whole of the network is operating and to which all network devices are synchronised. From these frame boundaries, the phase controller 288 generates a synchronous, but phase-advanced, version of the frame boundaries under which the video source 292 operates. The purpose is that the video source 292 operates slightly in advance of the network frame boundaries, which allows a whole frame 302 of video data to be output from the buffer 284 during a first portion 304 of a network frame period, such that a Virtual Blanking Interval 306 occurs at the end of the network frame period. So, the first portion 304 starts at a frame boundary indicated by a line 300 in FIG. 8, and ends before the next frame boundary, such that the gap between the end of the portion 304 and the next-following frame boundary forms the Virtual Blanking Interval. As before, the maximum buffer occupancy (corresponding to the length 308 of the Virtual Blanking Interval occurs at the network frame boundary indicated by the line 300, and the minimum buffer occupancy occurs at the end 310 of the portion 304.

Clearly, FIGS. 7 and 8 indicates just an example technique for producing a Virtual Blanking Interval at the end of a network frame period. Another way would be to buffer almost all of a frame at the video source, but this would lead to a greater system latency than the arrangement shown in FIG. 7 and FIG. 8.

In other arrangements, these techniques can be combined, such that the Virtual Blanking Interval spans a frame boundary so that part of the Virtual Blanking Interval occurs before the frame boundary and part occurs after the frame boundary.

In other arrangements, the video source can simply be controlled so as to output video data only during a portion of each frame period which does not correspond to the Virtual Blanking Interval.

All of these are examples of each node acting as a packetized video data source being configured to launch onto the network packetized video data such that, for at least those video frame periods adjacent to a switching operation (or in embodiments of the disclosure, in respect of all video frames provided by that node): the node launches onto the network packetized video data required for decoding that frame during a predetermined active video data portion of the video frame period, and the node does not launch onto the network packetized video data required for decoding that frame during a predetermined remaining portion (the Virtual Blanking Period in this example) of the video frame period. The arrangements of FIGS. 5 and 7 provide an example of a node having a buffer configured to store and output the video data packets, the buffer being configured to output packetized video data required for decoding that frame during a predetermined active video data portion of the video frame period, and not to output packetized video data required for decoding that frame during a predetermined remaining portion of the video frame period. The node may be provided with or may be separately connectable to a source of packetized video data providing video data packets distributed throughout each video frame period.

Figure 9:
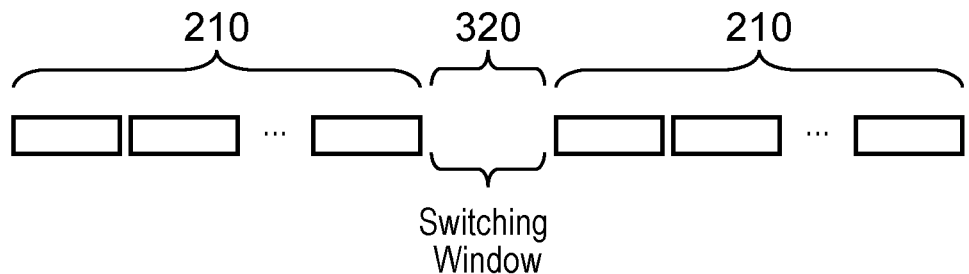
FIG. 9 is a schematic timing diagram.

FIG. 9 is a schematic timing diagram which, in a similar manner to FIG. 4, indicates that a Virtual Blanking Interval 320 between successive packet groups or trains corresponding to successive respective frames acts as a switching window of time during which a clean switch can be made between one source stream and another time-synchronised source stream.

Figure 10:
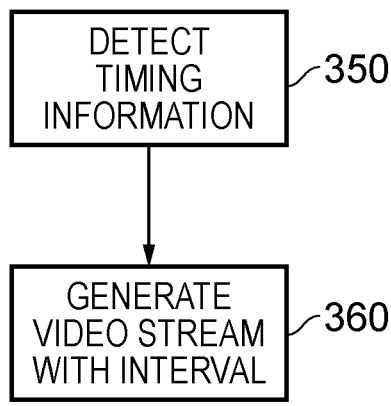
FIG. 10 is a schematic flow chart illustrating operations of a video source.

FIG. 10 is a schematic flow chart illustrating operations of a video source such as the video source 250 of FIG. 5 or the video source 280 of FIG. 7. Also, as discussed above, in other examples the operations of FIG. 10 could apply to a stand-alone packet stream shaping arrangement corresponding to (for example) the buffer and buffer controller (optionally with the phase controller) of FIGS. 5 and 7.

At a step 350, timing information defined by, for example, the timing control signal from the timing controller 160, is detected and, in response to that detection, as a step 360 a video stream is generated so as to contain a Virtual Blanking Interval.

Figure 11:
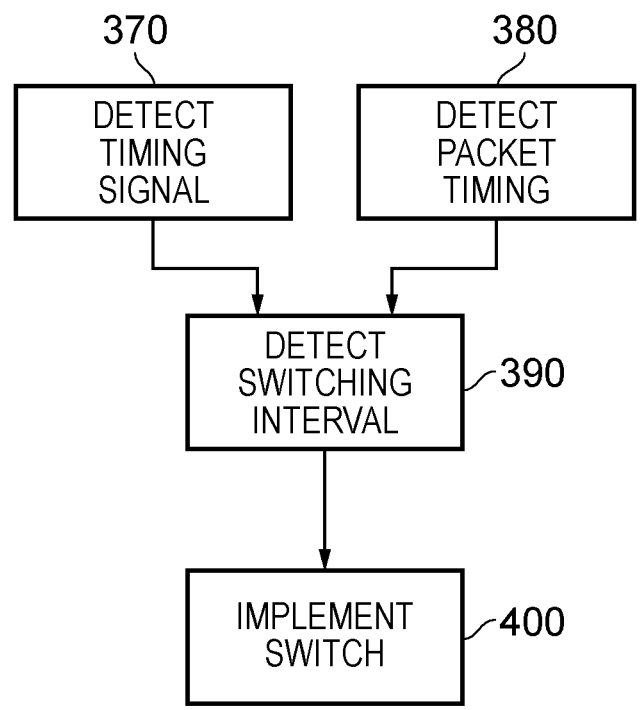
FIG. 11 is a schematic flow chart illustrating operations of a routing controller.

FIG. 11 is a schematic flow chart illustrating operations of a routing controller if such as the routing controller 170 of FIG. 3, in terms of its operations to control the switch 140 of FIG. 3.

Two alternatives are provided for a first step of the process shown in FIG. 11. They are drawn as parallel alternatives in FIG. 11 but the expectation would be that either one or the other would be carried out. The alternatives relates to methods by which the timing (relative to frame boundaries) of the Virtual Blanking Interval can be detected by the packet routing arrangement. One alternative, at a step 370, is that the routing controller 170 operates under the control of the same timing control signal provided by the timing controller 160. The step 370 involves detecting the frame timing from that timing control signal. As an alternative, a step 380 involves detecting frame timing from inspection of packets being passed through the switch 140. In either case, control passes to a step 390 which, from the detected frame timing at either the step 370 or the step 380, the time period of each frame period corresponding to the Virtual Blanking Interval is detected. At a step 400, a switch between one video source and another video source is implemented (for example, by causing or writing a change in the routing table 142) during the Virtual Blanking Interval.

Figure 12:
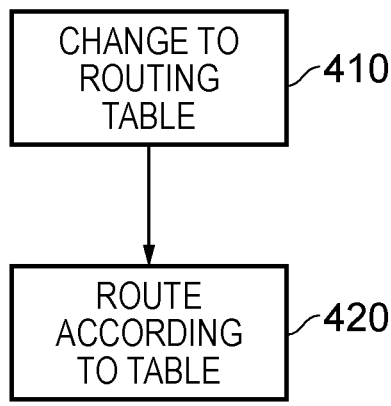
FIG. 12 is a schematic flow chart illustrating operations of a packet switch.

FIG. 12 is a schematic flow chart illustrating operations of a packet switch such as the switch 140 of FIG. 3. At a step 410, a change is implemented in the routing table 142, and at a step 420, the forwarding engine 144 routes packets according to the current state of the routing table. As discussed above, the change at the step 410 is made such that it takes effect no earlier than the start of the Virtual Blanking Interval, and the corresponding routing change is complete by the end of that same Virtual Blanking Interval.

Figure 13:
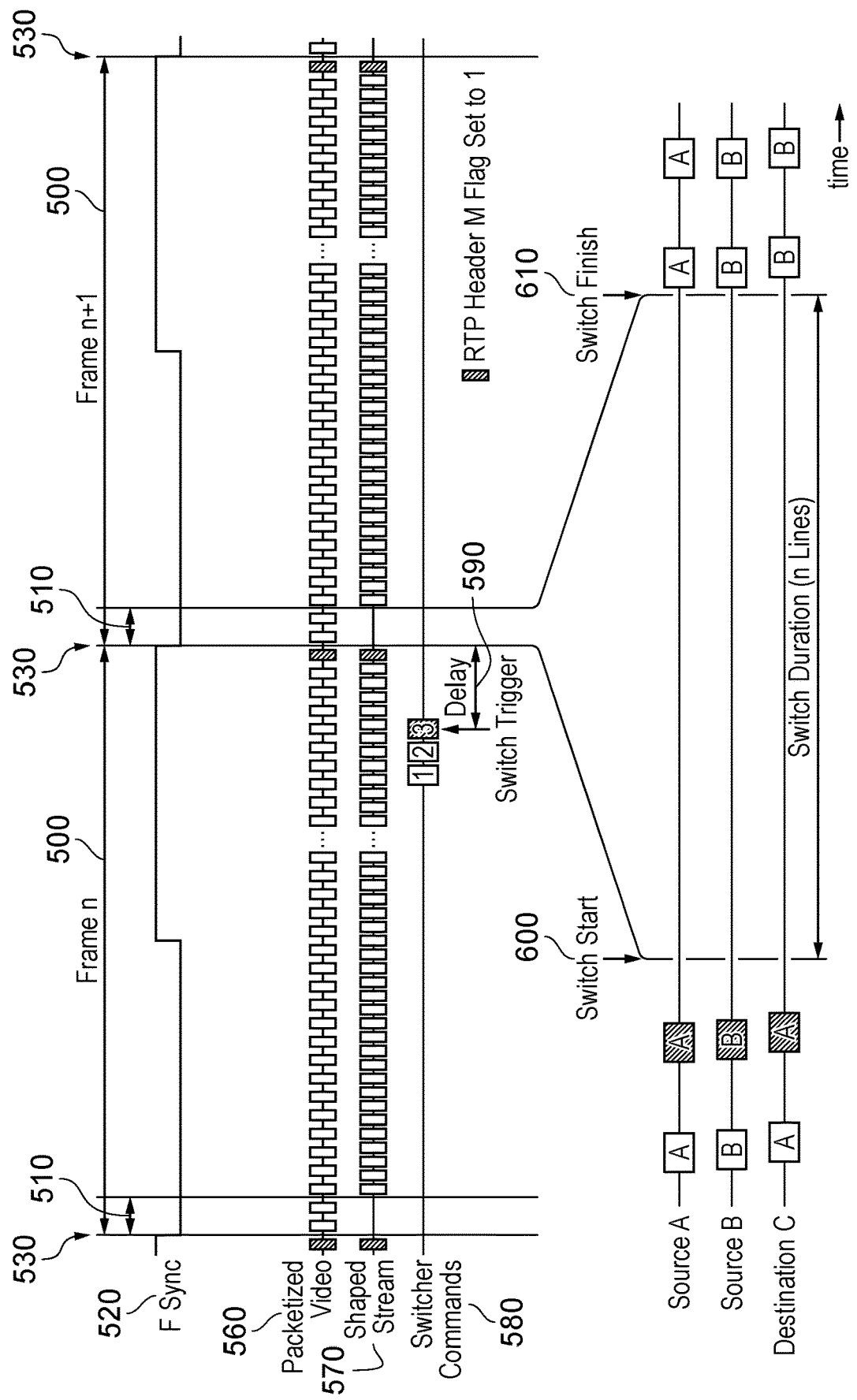
FIG. 13 is a schematic timing diagram.

FIG. 13 is a schematic timing diagram illustrating some of the operations described above in more detail. Successive frame periods 500 contain respective Virtual Blanking Intervals 510, in this example at the start of each frame period. A frame synchronisation (F sync) signal 520 indicates frame boundaries 530. A line 560 schematically represents packetized video as output by a video data source such as the source 252 of FIG. 5 or the source 292 of FIG. 7, which is to say a packetized video output before the application of video stream shaping. A line 570 schematically represents a shaped video stream, which is to say that no active video packets occurred during the Virtual Blanking Intervals 510. As discussed above, other packets may be present during those intervals.

Switch commands 580 which are implemented by the routing controller 170 and the switch 140 take place over a short period of time in advance of the Virtual Blanking Interval and comprise three stages (numbered here according to the numbering shown in the portion 580 of FIG. 13):

1. Prepare to connect new source to destination
2. Prepare to disconnect existing source from destination
3. Make switch connections The third of these commands, acting as a switch trigger, is arranged to occur a predefined delay period 590 before the start of the Virtual Blanking Interval 510. The delay period corresponds to the time period taken for a command, once initiated, to be executed by the routing controller 170 and the switch 140.

A lower portion of FIG. 13 is a representation of an expanded version of the Virtual Blanking Interval 510 and a few surrounding packets. The notation used in this portion of FIG. 13 is that source "A" is a current source which is currently routed to the destination ("C"). A new source "B" is to be routed to the destination in place of the source A. The maximum length, in time, of the switching operation is equal to the length, in time, of the Virtual Blanking Interval 510, such that the earliest that the switching operation may start is at a 600 and the latest time by which the switch operation must finish is at a point in time 610. The video packets provided to the destination C are successfully switched from packets A to packets B.

Note that a further optional feature is also shown in FIG. 13, which is that the last packet before the Virtual Blanking Interval can be arranged to have the RTP (real-time protocol) header M flag set to 1 (which indicates the last media data packet of a video frame)

As mentioned earlier, the Virtual Blanking Interval techniques discussed above may also be used in connection with source-timed switching operation. Accordingly, the description below relates to aspects of an example source-timed operation but in the context of the use of the Virtual Blanking Interval.

Figure 2:
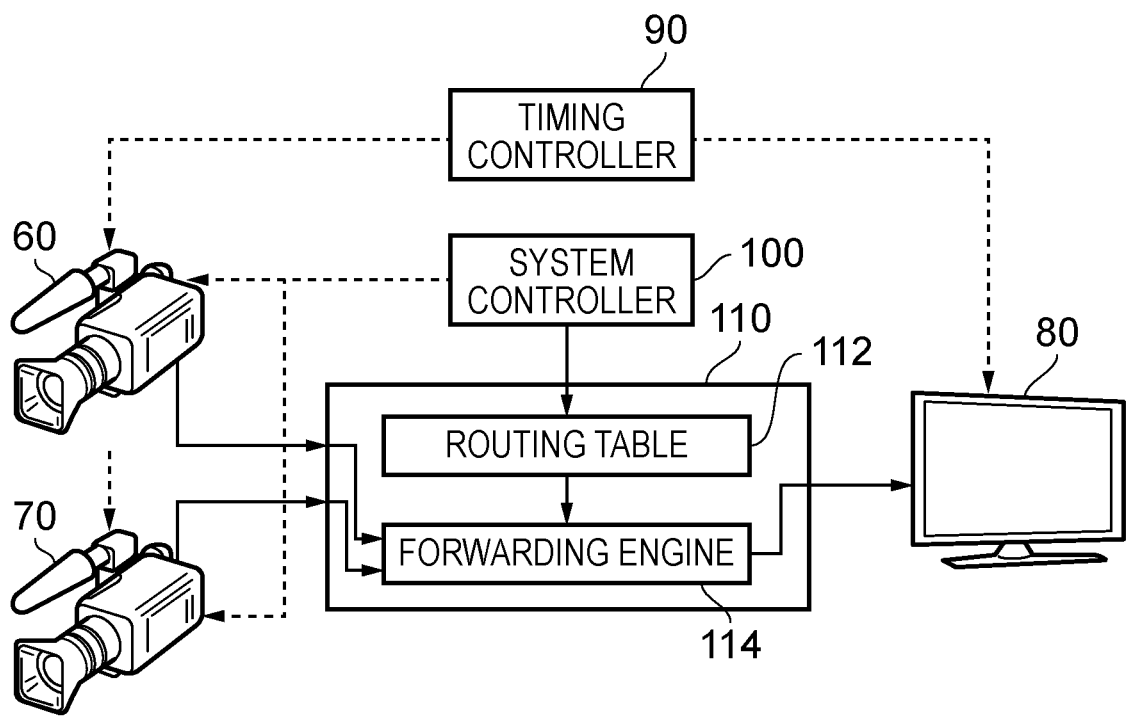
FIG. 2 is a schematic block diagram of a previously proposed video studio network illustrating source-timed packet switching.

The examples to be discussed relate to the schematic example network of FIG. 2, although the sources 60, 70 should be considered as being replaced by video sources such as those shown in FIG. 5 or FIG. 7 so that a Virtual Blanking Interval is imposed on the packet train relating to each video frame. Accordingly, although the sources will be referred to by the reference numerals 60, 70 in the following discussion, it will be understood that rather than previously proposed sources, they are sources providing video data having a Virtual Blanking Interval.

Figures 14, 15, 16, 17, 18:
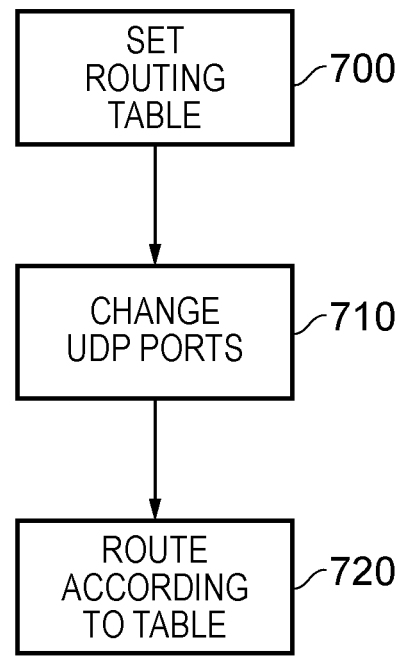
FIG. 14 schematically illustrates routing data.
FIG. 15 schematically illustrates an SDN switch flow table.
FIG. 16 schematically illustrates revised routing data.
FIG. 17 schematically illustrates a revised SDN switch flow table.
FIG. 18 is a schematic flow chart relating to a source timed switching operation.

FIG. 14 schematically illustrates version 1 of routing data held by the system controller 100, indicating that video data from the source 60 should be routed to the destination 80.

FIG. 15 schematically illustrates an SDN switch flow table corresponding to the routing data of FIG. 14. The SDN switch flow table may be stored as the routing table 112 in the arrangement of FIG. 2. In the present example, the SDN switch flow table has three entries corresponding to a particular source. These comprise: the IP address of the source, a UDP port currently associated with video data from that source, and a forwarding rule. In this particular example, the only entry in the SDN switch flow table relates to the source 60, so the IP address is the IP address of the source 60, the UDP port has an example value of 100, and the forwarding rule is that data from that IP address and having that UDP port are forwarded to the port or output of the switch 110 corresponding to the destination 80.

FIG. 16 schematically illustrates revised (version 2) routing data representing a change to the required routing of the video data. The newly required routing involves video data from the source 70 (rather than the source 60) being routed to the destination 80.

FIG. 17 schematically illustrates a revised SDN switch flow table corresponding to the revised routing data of FIG. 16. Here, the previous routing information relating to UDP port 100 is retained, at least for the time being, and new routing information detailing the IP address of the source 70, a different UDP port (200 in this example) and a forwarding rule involving forwarding to the port or output corresponding to the destination 80 are specified.

So far in the process, no actual change has been made to the flow of video data. That change occurs when the source 70 is instructed to start outputting video data carrying the UDP 200, and the source 60 is instructed to stop outputting video data carrying the UDP 100. In examples, the instructions issued to the sources to implement such changes can be sent in advance of the switch time, but time-stamped to indicate the switch time (that is to say, provided with ancillary data indicating a time relative to the frame timing and/or the packet streams at which the change is to be effected).

FIG. 18 is a schematic flow chart relating to a source timed switching operation. At a step 700, the SDN switch flow table or routing table 112 is set to include the newly required routing information (for example, using the revised table of FIG. 17). At a step 710, the sources are instructed to change their UDP assignments. This has the automatic result that at a step 720, the video data is routed according to the newly assigned UDP ports.

As mentioned, the difference between this process and the previously proposed source-timed process discussed earlier with reference to FIG. 2 is that a Virtual Blanking Interval is provided in the train of packets representing frames of video data for each source. This is not relevant to the step 700 of FIG. 18, which is a part of the process which can be conducted in advance of the actual switch operation, but it is relevant to the step 710 of FIG. 18, which is the time-critical part of the switching process of FIG. 18, in that the presence of the Virtual Blanking Interval allows a longer window of time during which the sources can (a) be instructed to change their UDP ports and (b) can complete their response to such an instruction, without affecting the integrity of either the frame preceding the instruction to change UDP ports or the frame following the instruction to change UDP ports. As mentioned above, in some examples, the implementation of the change of UDP port is carried out according to a time stamp associated with the instruction to change, the time stamp indicating a time within the Virtual Blanking Interval.

In summary, the above embodiments disclose a method of operation of a packet-based video network comprising a plurality of packetized video data nodes acting as packetized video data sources and/or packetized video data destinations and a packet switch configured to provide at least two selectable video packet routes amongst the plurality of nodes and to switch from one of the video packet routes to another of the video packet routes at a switching operation; the method comprising the steps of:

synchronising the video frame periods of at least those nodes acting as packetized video data sources;

each node acting as a packetized video data source launching onto the network packetized video data such that, for at least those video frame periods adjacent to a switching operation:

the node launches onto the network packetized video data required for decoding that frame during a predetermined active video data portion of the video frame period, and the node does not launch onto the network packetized video data required for decoding that frame during a predetermined remaining portion of the video frame period;

and implementing a switching operation from one of the video packet routes to another of the video packet routes during a time period corresponding to the predetermined remaining portion.

The embodiments also disclose corresponding methods of operation of a node and of a packet switch.

It will be appreciated that audio data may accompany the video data and may be clean-switched using the same techniques as those described above.

Data Signals

It will be appreciated that data signals generated by the variants of coding apparatus discussed above, and storage or transmission media carrying such signals, are considered to represent embodiments of the present disclosure. In particular, a packetized video data signal having a Virtual Blanking Interval provided or imposed on the train of packets is considered as an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent to the skilled person that numerous modifications and variations of the present disclosure are possible in light of the above teachings. It is therefore to be understood that within the scope of the appended claims, the present disclosure may be practised otherwise than as specifically described herein.

References to a video data source and/or to a video data destination in the above description should be taken (where the context allows) to refer to video data source circuitry and/or video data destination circuitry, respectively.

Examples of a packetized video data node can include, for example, a camera, a video processor, a video data transmitter and/or receiver, a video data recorder or the like.

Respective features of embodiments of the disclosure are defined by the following numbered clauses:

1. A packet-based video network comprising:

a plurality of packetized video data nodes acting as packetized video data sources and/or packetized video data destinations;

a packet switch configured to provide at least two selectable video packet routes amongst the plurality of nodes and to switch from one of the video packet routes to another of the video packet routes at a switching operation; and a video synchroniser configured to synchronise the video frame periods of at least those nodes acting as packetized video data sources; in which:

each node acting as a packetized video data source is configured to launch onto the network packetized video data such that, for at least those video frame periods adjacent to a switching operation:

the node launches onto the network packetized video data required for decoding that frame during a predetermined active video data portion of the video frame period, and the node does not launch onto the network packetized video data required for decoding that frame during a predetermined remaining portion of the video frame period;

and the network is configured so that a switching operation from one of the video packet routes to another of the video packet routes is implemented during a time period corresponding to the predetermined remaining portion.

2. A network according to clause 1, in which each node acting as a packetized video data source is configured to launch onto the network packetized video data in respect of all video frames provided by that node such that the node launches onto the network packetized video data required for decoding that frame during a predetermined active video data portion of the video frame period, and the node does not launch onto the network packetized video data required for decoding that frame during a predetermined remaining portion of the video frame period.

3. A network according to clause 1 or clause 2, in which the packet switch comprises a routing data memory configured to store routing data, such that the packet switch routes video data packets between nodes according to one or more video packet routes defined by the routing data stored by the routing data memory.

4. A network according to clause 4, in which the network is configured so that at a switching operation, new routing data is written to the routing data memory at a time so that a change in routing takes effect during a time period corresponding to the predetermined remaining portion.

5. A network according to any one of the preceding clauses, in which those nodes acting as video data sources each comprise:

a source of packetized video data providing video data packets distributed throughout each video frame period; and a buffer configured to store and output the video data packets, the buffer being configured to output packetized video data required for decoding that frame during a predetermined active video data portion of the video frame period, and not to output packetized video data required for decoding that frame during a predetermined remaining portion of the video frame period.

6. A packetized video data node connectable to a packet-based video data network as a packetized video data source, the packetized video data node comprising circuitry configured to launch onto the network packetized video data such that, for at least a subset of video frame periods:
the node launches onto the network packetized video data required for decoding that frame during a predetermined active video data portion of the video frame period, and
the node does not launch onto the network packetized video data required for decoding that frame during a predetermined remaining portion of the video frame period.

7. A node according to clause 6, comprising a buffer configured to store and output video data packets received by the buffer throughout a video frame period, the buffer being configured to output packetized video data required for decoding that frame during a predetermined active video data portion of the video frame period, and not to output packetized video data required for decoding that frame during a predetermined remaining portion of the video frame period.

8. A node according to clause 6 or clause 7, comprising:
a source of packetized video data providing video data packets distributed throughout each video frame period.

9. A video packet switch configured to provide at least two selectable video packet routes amongst a plurality of packetized video nodes and to switch from one of the video packet routes to another of the video packet routes at a switching operation; the video packet switch comprising circuitry configured to implement a switching operation from one of the video packet routes to another of the video packet routes during a time period of a video frame in which a packetized video node involved in the switching operation does not launch onto the network packetized video data required for decoding that frame.

10. A method of operation of a packet-based video network comprising a plurality of packetized video data nodes acting as packetized video data sources and/or packetized video data destinations and a packet switch configured to provide at least two selectable video packet routes amongst the plurality of nodes and to switch from one of the video packet routes to another of the video packet routes at a switching operation;
the method comprising the steps of:
synchronising the video frame periods of at least those nodes acting as packetized video data sources;
each node acting as a packetized video data source launching onto the network packetized video data such that, for at least those video frame periods adjacent to a switching operation:
the node launches onto the network packetized video data required for decoding that frame during a predetermined active video data portion of the video frame period, and
the node does not launch onto the network packetized video data required for decoding that frame during a predetermined remaining portion of the video frame period;
and implementing a switching operation from one of the video packet routes to another of the video packet routes during a time period corresponding to the predetermined remaining portion.

11. A method of operation of a packetized video data node connectable to a packet-based video data network as a packetized video data source, the method comprising the step of:
launching onto the network packetized video data such that, for at least a subset of video frame periods:
the node launches onto the network packetized video data required for decoding that frame during a predetermined active video data portion of the video frame period, and
the node does not launch onto the network packetized video data required for decoding that frame during a predetermined remaining portion of the video frame period.

12. A method of operation of a video packet switch configured to provide at least two selectable video packet routes amongst a plurality of packetized video nodes and to switch from one of the video packet routes to another of the video packet routes at a switching operation; the method comprising the step of:
implementing a switching operation from one of the video packet routes to another of the video packet routes during a time period of a video frame in which a packetized video node involved in the switching operation does not launch onto the network packetized video data required for decoding that frame.

13. Computer software which, when executed by a computer, causes the computer to perform the method of any one of clauses 10 to 12.

14. A non-transitory machine-readable storage medium which stores computer software according to clause 13.

The invention claimed is:

1. A packet-based video network comprising:
a plurality of packetized video data nodes acting as packetized video data sources and/or packetized video data destinations;
packet switch circuitry configured to provide at least two selectable video packet routes amongst the plurality of packetized video data nodes and to switch from one of the video packet routes to another of the video packet routes at a switching operation, the packet switch circuitry including:
a routing data memory configured to store routing data, such that the packet switch circuitry routes video data packets between packetized video data nodes according to one or more video packet routes defined by the routing data stored by the routing data memory; and
video synchroniser circuitry configured to synchronise video frame periods of at least those packetized video data nodes acting as packetized video data sources, wherein:
each packetized video data node acting as a packetized video data source is configured to launch packetized video data onto a network such that, for at least those video frame periods adjacent to the switching operation:
the packetized video data node launches the packetized video data onto the network during a predetermined active video data portion of the at least those video frame periods, the packetized video data being required for reproduction,
the packetized video data node does not launch the packetized video data onto the network during a predetermined remaining portion of the at least those video frame periods,
the packet-based video network is configured so that the switching operation from one of the video packet routes to another of the video packet routes is implemented during a time period corresponding to the predetermined remaining portion, and
the packet switch circuitry is further configured to write new routing data to the routing data memory at the switching operation so that a change in routing takes effect during the time period corresponding to the predetermined remaining portion.

2. The network according to claim 1, wherein each packetized video data node acting as the packetized video data source is configured to launch the packetized video data onto the network in respect of all video frames provided by that packetized video data node such that the packetized video data node launches the packetized video data onto the network during the predetermined active video data portion of the at least those video frame periods, and the packetized video data node does not launch the packetized video data onto the network during the predetermined remaining portion of the at least those video frame periods.

3. The network according to claim 1, wherein those packetized video data nodes acting as the video data sources each comprise:
   a source of packetized video data providing video data packets distributed throughout each video frame period; and
   a buffer configured to store and output the video data packets, the buffer being configured to output the packetized video data during the predetermined active video data portion of the at least those video frame periods, and not to output the packetized video data required during the predetermined remaining portion of the at least those video frame periods.

4. The network according to claim 1, wherein the at least those video frame periods adjacent to the switching operation include two consecutive video frames that share a frame boundary, and the predetermined remaining portion of the at least those video frame period overlaps with the frame boundary.

5. A packetized video data node connectable to a network as a packetized video data source, the packetized video data node comprising:
   circuitry configured to launch packetized video data onto the network such that, for at least a subset of video frame periods:
      the packetized video data node launches the packetized video data onto the network during a predetermined active video data portion of the at least the subset of video frame periods, the packetized video data being required for reproduction, and
      the packetized video data node does not launch the packetized video data onto the network during a predetermined remaining portion of the at least subset of video frame periods,
   wherein the circuitry is further configured to write new routing data to a routing data memory at a switching operation from the packetized video data node to another packetized video data node so that a change in routing takes effect during a time period corresponding to the predetermined remaining portion.

6. The packetized video data node according to claim 5, further comprising:
   a buffer configured to store and output video data packets received by the buffer throughout a video frame period, the buffer being configured to output the packetized video data during the predetermined active video data portion of the at least the subset of video frame periods, and not to output the packetized video data during the predetermined remaining portion of the at least the subset of video frame periods.

7. The packetized video data node according to claim 5, further comprising:
   a source of packetized video data providing video data packets distributed throughout each video frame period.

8. A video packet switch configured to provide at least two selectable video packet routes amongst a plurality of packetized video nodes and to switch from one of the video packet routes to another of the video packet routes at a switching operation, the video packet switch comprising:
   circuitry configured to:
      implement the switching operation from one of the video packet routes to another of the video packet routes during a first time period of a video frame in which a packetized video node involved in the switching operation does not launch packetized video data onto a network, the packetized video data being required for reproduction,
      store routing data in a routing data memory, such that the circuitry routes video data packets between packetized video data nodes according to one or more video packet routes defined by the routing data stored by the routing data memory, wherein
      the circuitry is further configured to write new routing data to the routing data memory at the switching operation so that a change in routing takes effect during a second time period corresponding to the first time period.

9. A method for operating a packet-based video network comprising a plurality of packetized video data nodes acting as packetized video data sources and/or packetized video data destinations and packet switch circuitry configured to provide at least two selectable video packet routes amongst the plurality of packetized video data nodes and to switch from one of the video packet routes to another of the video packet routes at a switching operation, the method comprising:
   synchronising video frame periods of at least those packetized video data nodes acting as packetized video data sources;
   storing routing data in a routing data memory, such that the packet switch circuitry routes video data packets between packetized video data nodes according to one or more video packet routes defined by the routing data stored by the routing data memory,
   each packetized video data node acting as a packetized video data source launching packetized video data onto a network such that, for at least those video frame periods adjacent to the switching operation:
      the packetized video data node launches packetized video data onto the network during a predetermined active video data portion of the at least those video frame periods, the packetized video data being required for reproduction, and
      the packetized video data node does not launch the packetized video data onto the network during a predetermined remaining portion of the at least those video frame periods,
   implementing the switching operation from one of the video packet routes to another of the video packet routes during a time period corresponding to the predetermined remaining portion, and
   writing, by the packet switch circuitry, new routing data to the routing data memory at the switching operation so that a change in routing takes effect during the time period corresponding to the predetermined remaining portion.

10. A non-transitory machine-readable storage medium which stores computer executable functions to perform the method according to claim 9.

11. A method for operating a packetized video data node connectable to a packet-based video data network as a packetized video data source, the method comprising:

storing routing data in a routing data memory, such that packet switch circuitry routes video data packets between packetized video data nodes according to one or more video packet routes defined by the routing data stored by the routing data memory; and launching packetized video data onto a network such that, for at least a subset of video frame periods:

the packetized video data node launches the packetized video data onto the network during a predetermined active video data portion of the at least the subset of video frame periods, the packetized video data being required for reproduction, and the packetized video data node does not launch packetized video data onto the network during a predetermined remaining portion of the at least the subset of video frame periods; and writing, by the packet switch circuitry, new routing data to the routing data memory at the switching operation so that a change in routing takes effect during a time period corresponding to the predetermined remaining portion.

12. A method for operating a video packet switch circuitry configured to provide at least two selectable video packet routes amongst a plurality of packetized video nodes and to switch from one of the video packet routes to another of the video packet routes at a switching operation, the method comprising:

storing routing data in a routing data memory, such that the video packet switch circuitry routes video data packets between packetized video data nodes according to one or more video packet routes defined by the routing data stored by the routing data memory; and implementing the switching operation from one of the video packet routes to another of the video packet routes during a time period of a video frame in which a packetized video node involved in the switching operation does not launch packetized video data onto a network, the packetized video data being required for reproduction; and writing, by the video packet switch circuitry, new routing data to the routing data memory at the switching operation so that a change in routing takes effect during a predetermined remaining portion of the time period.

* * * * *